US009219740B2

(12) United States Patent
Subramanian et al.

(10) Patent No.: US 9,219,740 B2
(45) Date of Patent: Dec. 22, 2015

(54) ACCESS CONTROL SYSTEM AND METHOD

(75) Inventors: Murali Subramanian, Bangalore Karnataka (IN); Anantha Keerthi Banavara Ramaswamy, Bangalore Karnataka (IN); Arun Keshava Murthy, Bangalore Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 1443 days.

(21) Appl. No.: 12/163,208

(22) Filed: Jun. 27, 2008

(65) Prior Publication Data

US 2009/0007242 A1 Jan. 1, 2009

(30) Foreign Application Priority Data

Jun. 27, 2007 (IN) .......................... 1380/CHE/2007

(51) Int. Cl.
*G06F 21/00* (2013.01)
*H04L 29/06* (2006.01)
*G06F 21/62* (2013.01)

(52) U.S. Cl.
CPC .......... *H04L 63/105* (2013.01); *G06F 21/6218* (2013.01); *G06F 2221/2113* (2013.01)

(58) Field of Classification Search
None
See application file for complete search history.

(56) References Cited

U.S. PATENT DOCUMENTS

| | | | | |
|---|---|---|---|---|
| 4,919,545 A * | 4/1990 | Yu | ................................. | 713/167 |
| 6,189,103 B1 * | 2/2001 | Nevarez | ................ | G06F 21/128 |
| | | | | 726/5 |
| 6,269,396 B1 * | 7/2001 | Shah | ................... | H04L 12/2602 |
| | | | | 709/223 |
| 6,289,462 B1 * | 9/2001 | McNabb | ............. | G06F 21/6218 |
| | | | | 726/21 |
| 6,745,245 B1 * | 6/2004 | Carpenter | ............... | G06F 21/10 |
| | | | | 380/239 |
| 6,765,886 B1 * | 7/2004 | Lobley | ................. | H04Q 3/0029 |
| | | | | 370/329 |
| 6,801,948 B2 | 10/2004 | Clark et al. | | |
| 7,467,370 B2 * | 12/2008 | Proudler | ................. | G06F 21/57 |
| | | | | 713/165 |
| 7,600,261 B2 * | 10/2009 | Wray | .............................. | 726/26 |
| 7,769,875 B1 * | 8/2010 | Moisand | ............. | H04L 67/2804 |
| | | | | 709/223 |
| 7,877,799 B2 * | 1/2011 | Proudler | ......................... | 726/21 |
| 8,042,193 B1 * | 10/2011 | Piliouras | ............... | H04L 9/3236 |
| | | | | 713/169 |
| 8,243,718 B2 * | 8/2012 | I'Anson | ................ | H04M 3/436 |
| | | | | 370/352 |
| 8,359,467 B2 * | 1/2013 | Subramanian | ...... | G06F 21/6218 |
| | | | | 713/165 |
| 2002/0023212 A1 * | 2/2002 | Proudler | ....................... | 713/164 |
| 2002/0078383 A1 | 6/2002 | Leerssen et al. | | |
| 2002/0112186 A1 * | 8/2002 | Ford et al. | ..................... | 713/201 |

(Continued)

OTHER PUBLICATIONS

Hewlett Packard Development Company, L,P.; HP-UX 11i Security Containment Software; http://h20000.www2.hp.com/bizsupport/TechSupport/DocumentIndex.jsp?ang=en&cc=us&taskId=101&prodClassId=10008&contentType=SupportManual&docIndexId=64255&prodTypeId=18964&prodSeriesId=4164884; Jun. 21, 2011.

(Continued)

*Primary Examiner* — Farid Homayounmehr
*Assistant Examiner* — Sanchit Sarker
(74) *Attorney, Agent, or Firm* — EIP Europe LLP (57) ABSTRACT

Certain embodiments of the invention relate to an access control system defining one or more compartments and providing rules, which are applied to the compartment(s), to control access to network services by entities that are associated with a said compartment, the rules comprising at least a first kind of rule for controlling access to network services that use dynamically-assigned communications ports.

9 Claims, 5 Drawing Sheets

(56) References Cited

U.S. PATENT DOCUMENTS

| | | | | |
|---|---|---|---|---|
| 2002/0129264 A1* | 9/2002 | Rowland | ............... | H04L 63/102 726/26 |
| 2003/0041268 A1* | 2/2003 | Hashimoto | ............. | G06F 21/31 726/4 |
| 2004/0017907 A1* | 1/2004 | Niizato | ................... | H04W 8/22 379/201.01 |
| 2005/0028003 A1* | 2/2005 | Wray | ............................ | 713/200 |
| 2005/0055570 A1* | 3/2005 | Kwan | ..................... | H04L 63/08 726/4 |
| 2007/0250933 A1* | 10/2007 | Rantanen | .............. | H04L 63/101 726/26 |
| 2008/0104196 A1* | 5/2008 | Yalakanti | .............. | H04L 41/046 709/217 |
| 2008/0295114 A1* | 11/2008 | Argade | ................... | G06F 9/485 719/320 |
| 2009/0007242 A1* | 1/2009 | Subramanian | ...... | G06F 21/6218 726/4 |
| 2012/0079114 A1* | 3/2012 | Leahy | .................... | G06Q 30/06 709/225 |

OTHER PUBLICATIONS

Kiyohiko Mita, PitBull, UNIX magazine, ASCII Inc. JP Apr. 1, 2007, vol. 22 No. 2, pp. 92-99—English Translation.

* cited by examiner

ACCESS CONTROL SYSTEM AND METHOD

RELATED APPLICATIONS

This patent application claims priority to Indian patent application serial number 1380/CHE/2007, having title "ACCESS CONTROL SYSTEM AND METHOD", filed on 27 Jun. 2007 in India (IN), commonly assigned herewith, and hereby incorporated by reference.

FIELD OF THE INVENTION

The present invention relates to access rights in computer systems.

BACKGROUND OF THE INVENTION

Operating systems are typically computer programs or sets of computer programs that are loaded into a computer's memory and executed in order to control the subsequent operation of a computer. However, operating systems can also be embedded programs in firmware or hardware, particularly, for example, in portable devices such as mobile telephones and PDAs Most, traditional computer operating systems offer some kind of logical protection to data in the form of access controls, which can be granted or denied to specific people or groups of people. Generally, in a system that offers discretionary access control (DAC) a user (as opposed to an administrator) is able to assign permissions to their data, which permit or deny others (or groups of others) access to the data. This is fine for individuals. However, some organisations, such as military or government organisations in particular, require the ability to more closely control access to information. For example, top secret information should not be visible to most people in an organisation, restricted information, as the label suggests, should not be generally available, whereas unrestricted information may be available for access by anyone in an organisation.

Accordingly, secure operating systems are known, which provide greater access control over an organisation's information. Typically, secure operating systems associate additional classifications or labels with files and apply so-called mandatory access control (MAC), which provides a means of restricting access to the files based on their sensitivity (for example, as represented by a sensitivity label). In contrast to DAC, under MAC a user does not have the right to determine who sees their data: only users having a compatible clearance are permitted to see the data. For example, a user with top secret clearance would not have the ability to permit others with a lesser clearance to see their data.

MAC can be expressed in terms of "compartments". In practice, a compartment is typically a logical construct having an identifier such as a name, applied to which are a set of administrator-configured access control rules that define the compartment. Compartment rules are used to permit access only to those resources (such as files, processes and interprocess communication methods) necessary for an application to execute. These rules apply both to users and processes that have permission to operate in the compartment, and, accordingly, unless otherwise stated or unless the context dictates otherwise, such users and processes will be referred to herein generally as "entities".

Thus, entities operating within a compartment can by default only access files, other process and resources that are defined to be accessible in the same compartment, unless specific MAC rules are provided to the contrary.

Compartments can provide an isolated runtime environment for an application, wherein the compartment rules allow access to only those resources that are necessary for the application to execute. This increases the likelihood that, even when an application is compromised, the damage is limited only to the compartment(s) where the application is running.

In addition to controlling access to file systems and the like, it is known for MAC to be used to control access to resources that are outside of a compartment, such as network end-points providing remote services generally and, more particularly, network services, by defining MAC rules, which grant or deny access to particular communications interfaces of a computing platform. As used herein, the term "network (or networked) service" is a computer program, which runs on a remote computer, or server, in a distributed computing environment of networked computers. Network services can be accessed, invoked, or "called", from a client (for example a host running a secure operating system), which is remote from the server running the service. Examples of network services are RPC services (such as ypserv, mountd etc), Web sites, X-terminals and FTP sites, to name just a few of the well-known services.

The ability to control access to network services increases security, by providing mechanisms for preventing an entity from accessing network services that may have been, or may in future be, compromised. The most common way in which a network service can be compromised is from a denial-of-service-attack, which floods the service (or server running the service) with dummy requests for service, in an attempt to render the service unavailable to legitimate users.

One known way of defining MAC for resource access is based on so-called labelled security protection profiles (LSPP), where the resource (for example, a network endpoint) is arranged to carry a label that specifies the access control policy on the resource. However, implementing MAC in this way requires a significant amount of effort and adaptation to traditional applications and operating systems. A known simpler way of defining MAC for resource access is based on using access control rules, which are specified for each individual compartment. Such control rules typically use TCP port numbers to uniquely identify network end-points, for example network services. Many network services use well-known, pre-assigned port numbers; for example, HTTP uses TCP port 80, POP3 uses port 110 and IRC uses port 194. In such cases, it is possible to grant or deny access to the services by granting or denying access to the respective ports using MAC rules. However, some network services, such as RPC services and XTERM services, do not use pre-assigned port numbers (that is, the port numbers are allocated or assigned dynamically at run time) and it is, therefore, not possible to grant or deny access by specifying port number in compartment rules. In the absence of such access control, if any such network service is compromised, then it may not be easy to contain or control the damage that can be done to an otherwise secure system.

It is an object of embodiments of the invention to at least mitigate one or more of the problems of the prior art.

SUMMARY OF THE INVENTION

In accordance with one aspect of the present invention, there is provided an access control system defining one or more compartments and providing rules, which are applied to the compartment(s), to control access to network services by entities that are associated with a said compartment, the rules comprising at least a first kind of rule for controlling access to network services that use dynamically-assigned communications ports.

In accordance with another aspect of the present invention, there is provided an access control method comprising:

receiving a network service call from a requesting entity, which is associated with a compartment of a secure operating system, the said network service using a dynamically assigned communications port;

determining, with respect to any rules that have been applied to the compartment, whether the entity has permission to access the network service; and processing the network service call only if an applied compartment rule grants permission to access the network service.

In accordance with yet another aspect of the present invention, there is provided a data processing system arranged to process a network service call, comprising:

an input for receiving, from an entity that is associated with a compartment of the system, a call for a network service that uses a dynamically assigned communications port;

a store storing rules that are applied to compartments and which define associated network service access permissions; and a process which enacts the network service call only if the store contains a said compartment rule that grants permission to access the network service.

Known secure operating systems are SELinux™, Trusted Solaris™ and HP-UX Security Containment™, and embodiments of aspects of the present invention can be applied to these operating systems, although the principles taught are more widely applicable.

Further features and advantages of the invention will become apparent from the following description of preferred embodiments of the invention, given by way of example only, which is made with reference to the accompanying drawings.

DETAILED DESCRIPTION OF THE INVENTION

While it is known to be able to control access to (or use of) network services, which use known port numbers, embodiments of the present invention relate to a new class of compartment rule, which controls access to (or use of) network services which use dynamically assigned port numbers.

Before describing embodiments of the invention in detail, a computing environment suitable for implementing certain embodiments of the invention will now be described.

Figure 1:
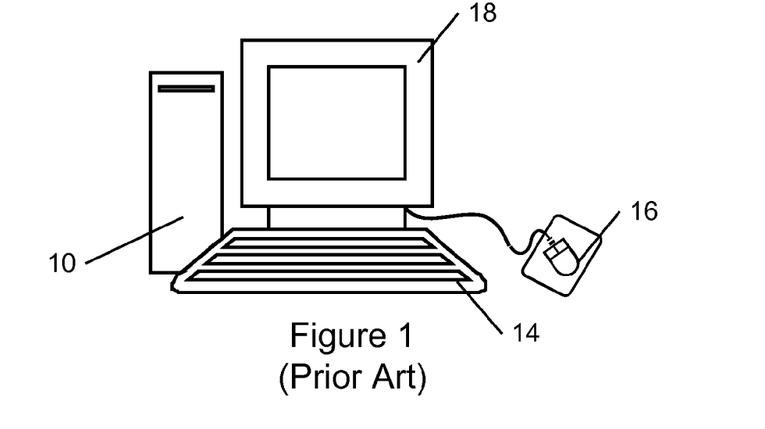
FIG. 1 is a diagram showing an exemplary computing environment suitable for operation according to embodiments of the present invention.

An exemplary computing platform 10 suitable for implementing embodiments of the invention is illustrated in the diagram in FIG. 1. The computing platform 10 has the standard features of a keyboard 14, a mouse 16 and a visual display unit (VDU) 18, which provide the physical 'user interface' of the platform. The platform contains standard components such as a mother board and a hard disk drive for storing a file system.

Figure 2:
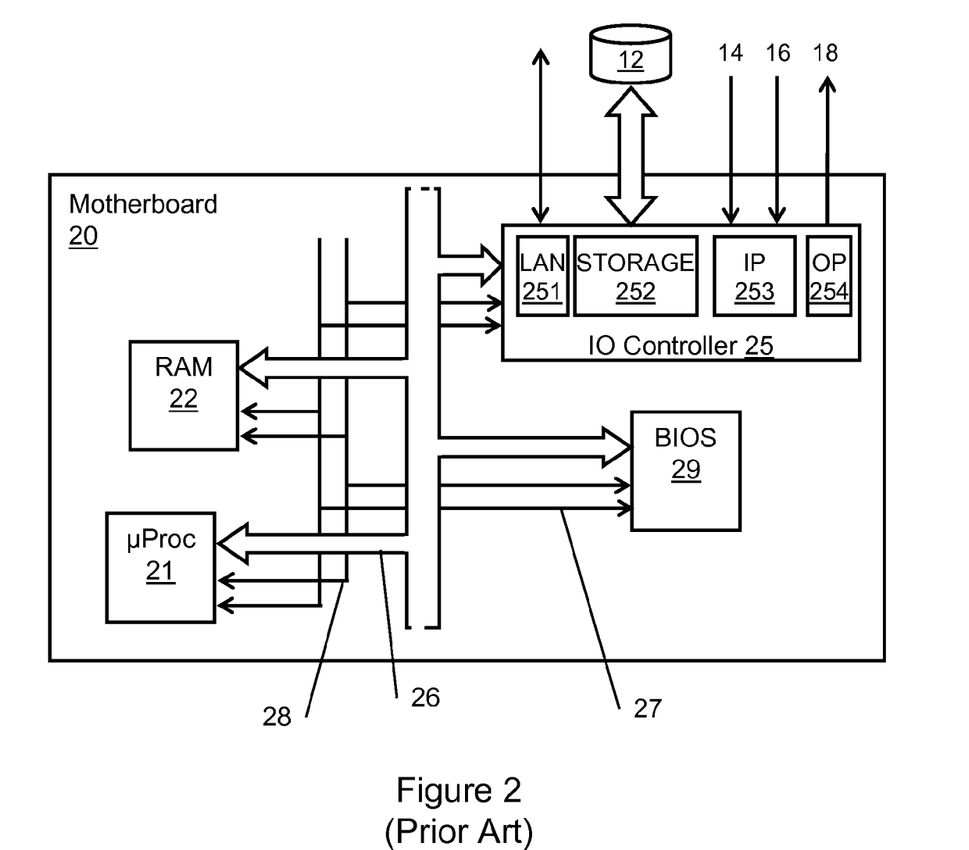
FIG. 2 is a diagram showing an exemplary motherboard for use with a computing platform of the kind shown in FIG. 1.

As illustrated in FIG. 2, the motherboard 20 of the computing platform 10 includes (among other standard components) a main processor 21, main computer memory 22, a data bus 26 and respective addressing lines 27 and control lines 28, BIOS memory 29 containing the BIOS program for the platform 10 and an Input/Output (IO) controller 25. The IO controller 25 (which may comprise one or more independent subsystems) controls interaction between the components of the motherboard and connected devices such as the keyboard 14 and the mouse 16 (via an input controller 253), the VDU 18 (via an output controller 254, for example a screen or graphics controller), a storage device 12 such as a hard disk (via a storage controller 252) and the outside world (via a network controller 251, for example an Ethernet LAN controller), which may be embodied on a network interface card (NIC). Communications with the outside world, for example across the Internet, are directed via the network controller 251 and, typically, include data packets. In known systems, the data packets are typically addressed to travel via a logical port number of a NIC or the like, as will be described in more detail hereinafter.

The main memory 22 is typically random access memory (RAM) and the BIOS memory is typically EEPROM, which can be 'flashed' with BIOS updates. In operation, the platform 10 loads the BIOS from the BIOS memory 29 and, in turn, loads an operating system from the hard disk 12 into RAM. The operating system controls every aspect of the operation of the computing platform and, in the present example, is a secure operating system that provides compartments. Additionally, in operation, the operating system loads the processes or applications that may be executed by the platform 10 into RAM 22 from hard disk 12.

Figure 3:
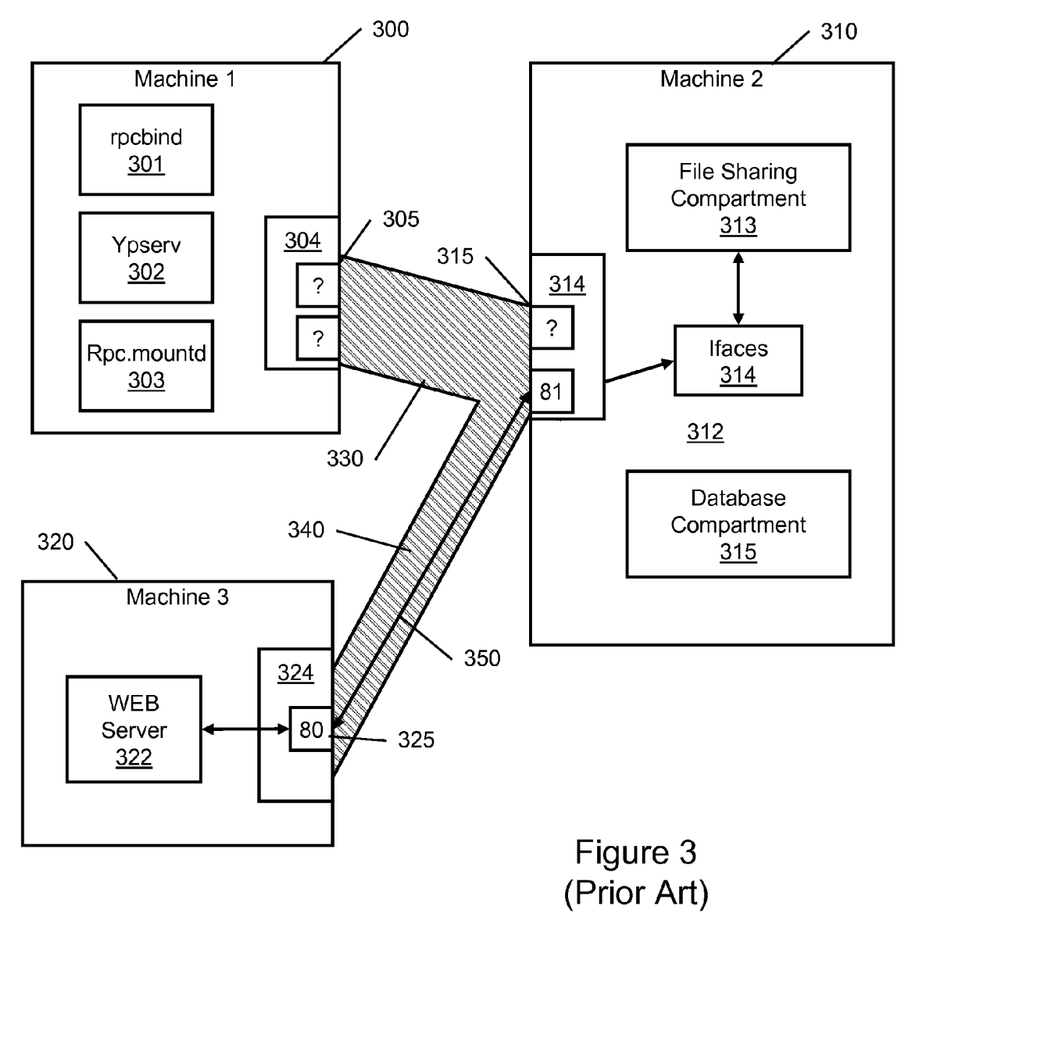
FIG. 3 is a schematic diagram illustrating three computing platforms in a distributed computing environment; the first platform operating as an RPC server, the second one operating as a client executing a compartmented operating system and the third one operating as a Web server.

The diagram in FIG. 3 illustrates a network scenario wherein there are three networked computers labelled Machine 1 (300), Machine 2 (310) and Machine 3 (320). Machine 1 is a server which runs the RPC network services rpcbind 301, ypserv 302 and rpc.mountd 303. These RPC services use dynamically assigned port numbers 304 on a network card 305. Machine 2 is running a secure operating system 312, which defines three compartments, designated 'File Sharing' 313, 'ifaces' 314 and 'Database' 315, which can communicate using ports 315 of a network card 314. Machine 3 is running a Web Server 322, which uses the pre-assigned port number 80 (325) on a network card 324. The shaded regions in the diagram represent a communications fabric or infrastructure, for example provided by a LAN, between the machines: a first shaded region 330 illustrates that Machine 1 and Machine 2 can in principle communicate with each other and a second shaded region 340 indicates that Machine 2 and Machine 3 can in principle communicate with each other. However, for communications to take place, logical connections (either packet or streams based) have to be established. One such logical connection, which permits communications to take place between port 81 of Machine 2 and port 80 of Machine 3, is shown by a solid arrow designated as 350.

It is possible to control access, by an entity operating in a compartment of Machine 2, to the Web Server 322 on Machine 3, using known secure operating systems, which can control access to network services that use fixed port number assignments and compartment-specific rules based on port number (or, more specifically, NIC, destination IP address and port number). An exemplary known rule of this kind will now be described by way of background and has the syntax:

"access, direction, protocol, port (port number),
    peer port (port number), compartment", where: access is set to grant or deny; direction dictates whether the rule applies to a client (outbound message from compartment) or to a server (inbound message to compartment); protocol can be set, for example, as TCP or UDP (or any other recognised protocol); port is a port of the machine containing the compartment; peer port is the port used by the machine containing the service (or network endpoint); and compartment is an identifier or name of a compartment which is associated with the network (or LAN) interface, which is used for the communications. For example, an access rule for a compartment called "File Sharing" might appear as:

[prior art MAC rule]

```
10    compartment File_Sharing {
20        grant server tcp port 81 peer port 80 ifaces
30        deny client tcp port 81 peer port 80 ifaces
40    }
50    compartment ifaces {
60        interface lan0
70    }
```

This access rule has the following meaning: line 10 names the compartment as File Sharing; line 20 grants the access control right to compartment File Sharing to receive from TCP port 80 of a remote computer (designated by server), TCP-protocol inbound communications to TCP port 81, which is associated with the interface card designated lan0 (not shown), which itself is associated with the compartment called ifaces; line 30 grants the access control right to compartment File Sharing (designated by client) for outgoing TCP communications from TCP port 81, through the lan0 interface card to TCP port 80 of a remote computer; line 40 ends the definition of the File Sharing Compartment; line 50 begins a definition of a compartment called ifaces; line 60, defines the ifaces Compartment to contain the lan0 interface (such that an entity of any other compartment can only communicate via the lan0 interface if it has permissions to access the ifaces compartment, as has been granted in lines 20 and 30 to the File Sharing Compartment); and line 70 ends the definition of the ifaces Compartment. It is known that Port 80 is the TCP port associated with HTTP, which is used for transferring web pages and, therefore, the File Sharing Compartment has, by the foregoing access control rules, been granted permission to interact with a Web Server.

In contrast with the ability to control access between the File Sharing Compartment 313 and the Web Server 322, it is not possible (using the class of rules described above) to grant access by the File Sharing Compartment 313 to the RPC services hosted by Machine 1, while at the same time denying access by the Database Compartment 315 to the RPC services on Machine 1; as the ports 305 on Machine 1 are dynamically assigned (and the respective port numbers are, therefore, labelled "?" as being unknown) and the rules cannot be applied.

However, according to certain embodiments of the present invention, as will be described, independent network service access control for each of the compartments can be achieved. As will be described in detail herein, embodiments of the present invention depend on a new class of rule, which is designed to control access network services which use dynamically assigned port assignments. The new rule can be represented, by way of example, as follows:

DPR G/D <MODULE> <STRING> where: DPR is the rule name, which represents "Dynamic Port Rule"; G/D is the permission GRANT or DENY; <MODULE> is the name of the network service (and a corresponding module or function, which will be described) to which the rule applies; and <STRING> is a unique identifier (which could be a number, a name or any other kind of reference) that is associated with the named network service (and the corresponding module or function).

Figure 4:
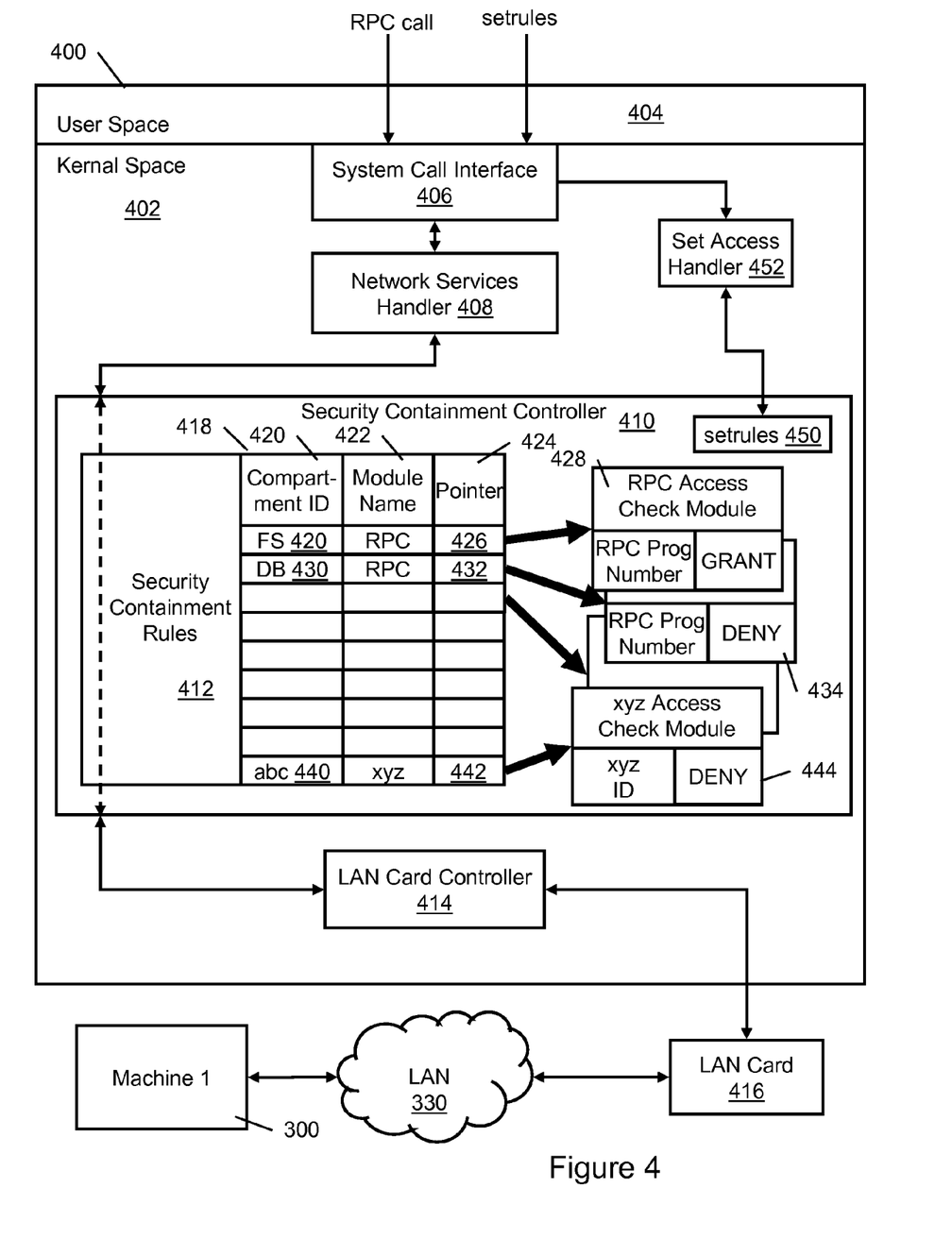
FIG. 4 is a schematic diagram illustrating the functional elements of a secure operating system that are necessary for implementing an embodiment of the present invention.

The diagram in FIG. 4 provides a high-level functional representation of a portion of an exemplary secure operating system, which has been adapted for operation according to the present embodiment. It is emphasised that embodiments of the invention are in no way limited to the arrangement or architecture illustrated in FIG. 4. One example of a secure operating system on which certain embodiments of the invention may be practiced is HP-UX Security Containment, version 2, release 11.31, which provides MAC and can be adapted as described herein to offer network services access rules, on a per-compartment basis, to network services that use dynamically-assigned ports. It will be appreciated, however, that certain embodiments of the invention may be implemented on other existing secure operating systems, and the principles described herein are in no way limited to application in the HP-UX product.

In the example that follows, the operating system is a compartment-based operating system offering MAC, which is implemented (in relation to network services) using compartment rules, as will be described. The operating system supports UNIX-like commands, existing rules for controlling access to network services that have known port numbers, and the new rule for controlling access to network services that have dynamically assigned port numbers. Again, embodiments of the invention are in no way limited to UNIX-like operating systems. For example, the principles could be applied equally to a Microsoft™ Windows™ based operating system or, indeed, to any other kind of operating system, including bespoke or embedded operating systems or the like.

The operating system 400 in FIG. 4 is shown having a Kernel Space 402, which is memory reserved for running the kernel of the operating system, and a User Space 404. The kernel is generally responsible for managing the computing platform's resources and the communications between the hardware and software components. The User Space 404 is a memory area where user applications execute and operate. The User Space 404 receives input from the user (via the mouse 16 or keyboard 14—sometimes referred to as the 'standard input') and passes it on to a System Call Interface 406. In the present context, when the input relates to a network services request of some kind, the command is passed by the System Call Interface 406 to a Network Services Handler 408.

The Network Services Handler 408 is a software program or function in the operating system (or called by the operating system) that processes network service calls with reference to access control rules which are provided by a Security Containment Controller 410. The Security Containment Controller 410 contains MAC rules in a Security Containment Rules function 412. The Security Containment Rules function 412 contains the rules in general defining each of the compartments of the system. In particular, the Security Containment Rules function 412, according to the present embodiment of the invention, includes rules defining network service access controls for compartments, as will be described below in more detail.

The Network Services Handler 408 establishes, by reference to the Security Containment Controller 410, if an entity (that is, a user or a process), which is associated with a compartment, and which has issued a network services call, has the access control rights necessary for the call to be invoked and completed. If the entity has the rights then the Network Service Handler 408 executes the associated network services call, in a known way, and interacts with a LAN Card Controller 414 (which uses BIOS calls), to interact with a respective network services server 300 via a LAN card 416 and LAN 330. If the entity does not have the rights, then access is denied in the traditional manner.

In relation in particular to the network services access control rules, as shown in FIG. 4, the Security Containment Rules function 412 includes a table 418 containing entries 420, for each identified compartment, for each network service that has been assigned access control permissions. In the example shown, only one table entry 420 for the "FS" Compartment is shown; and it will be appreciated that, in practice, there may be many rules for various compartments for which access controls are required. In principle, a compartment does not need any particular rule, in which case the default position is that entities operating in the compartment are denied access to respective network services.

As shown in FIG. 4, the compartment rules table 418 comprises a compartment name or ID column 420, a module name column 422 and a pointer column 424, where each row of the table (that is, each module name entry for an identified compartment) has a corresponding pointer. In this example, the pointers 426 (in the pointer column 424) are preferably 'opaque pointers', which provides the known advantage that the pointer is generic, so that it can support any kind of network service that uses dynamic port numbers (for example, RPC services and XTERM services), although, other kinds of pointer, which are specific to each kind of network service, may be used instead. Each of the pointers 426 points to a corresponding Access Check Module 428, which provides the MAC rule for the associated network service. In the case of the RPC network service, for example (and as illustrated), the module 428 name is "RPC", representing the service, and the pointer 426 points to an Access Check Module 428 for the RPC service. As already indicated, this module name is associated with a compartment called "FS" (which could be the File Sharing Compartment of FIG. 3). In this instance of the Access Check Module 428, access (for entities in the FS compartment) to the RPC service (identified by RPC Prog Number) is GRANT.

Each Access Check Module provides the MAC rules for the respective network service. As each network service is different, each Access Check Module will comprise appropriate respective functionality and will tend to operate in a different way, typically with different requirements for input (that is, different input arguments), but having the same kind of MAC output, which will be to GRANT or DENY access to the respective network service.

In principle, it may be necessary to have a number of different instances of each kind of Access Check Module; for example, there may be plural instances of the RPC Access Check Module, since different compartments may (and likely will) have different access control requirements for the RPC service (or, indeed, any other service). For example, the second entry 430 in the rules table relates to the "DB" compartment (which could be the Database Compartment 315 in FIG. 3). A respective pointer 432 for the DB entry 430 identifies a second RPC Access Check Module 434, which, in this instance, denies access to the identified RPC service. Indeed, absence of a compartment rule for any particular network service would also lead to the access being denied, thereby avoiding the situation where there needs to be an Access Check Module for every combination of defined compartment and network service.

However, while the same network service may need multiple Access Check Modules to cater for the requirements of different compartments, if two or more compartments have the same access control requirements for a given network service, then two respective entries in the compartment rules table 418 may point to the same Access Check Module.

By way of illustration only, the last entry 440 in the compartment rules table 418 is shown to relate to an arbitrary network service 'xyz', which could be any network service which uses dynamically-assigned ports, and a respective pointer 442 points to an appropriate Access Check Module 444, which denies access to the network service.

An exemplary network service MAC process will be described with reference to the flow diagram in FIG. 5. In this example, an RPC service call will be described, but, first, for background understanding purposes only, the RPC service will be described in general terms.

An exemplary remote procedure call according to RPC involves a caller process sending a call message to a server process and waiting for a reply message. The call message contains the parameters of the procedure and the reply message contains the procedure results of running the procedure. When the caller process receives the reply message, it continues executing. On the server side, the RPC service is typically dormant, awaiting the arrival of a respective RPC call message. When an RPC call message arrives, the service computes a reply that it then sends back to the requesting caller process.

In general, an RPC service may be identified at least by its RPC program number, version number, and a transport address where it may be reached. A version number is used to differentiate between various different versions of the same service, and is mostly utilised to evolve the service over time. The transport address, in turn, consists of a network address and a transport selector. In the case of a service available over TCP or UDP, the network address is an IP address, and the transport selector is a TCP or UDP port number. A caller process needs to know the RPC program number, version number, and the transport address corresponding to a service in order to utilize the service. Of these, the RPC program number and version number may be built into the caller process as part of the service definition. The network address component of the transport address is usually obtainable from a name service daemon, such as "named" (for example, found in HP-UX in the directory path /usr/sbin/named), or may be provided as a parameter to the caller process. As already explained herein, for RPC services, the transport selector (that is, the TCP or UDP port) is usually determined dynamically, and varies with each invocation of the service. Server programs allocate a transport address, and register it with a lookup service (such as rpcbind, or bind), which is associated with a fixed transport selector (that is, TCP port number 111), and resides at the same network address as the server. Caller processes are typically able to consult the lookup service in order to obtain the server's transport address, following which the RPC service can be invoked and completed.

Now, returning to FIG. 5, in a first step 500 the system receives an RPC call, for example, for the ypserv RPC service. The RPC call is received including the RPC program number for ypserv, which is 100004. Generally, in known systems, RPC calls are received in a machine by a known RPC service (or process), which is called rpc_call( ), which expects to receive a number of arguments or parameters, including RPC program number and version number. According to the present embodiment, when the RPC call is received by the System Call Interface 406, it is recognised as a network service call and passed to the Network Services Handler 408. The Network Services Handler 408 incorporates a modified version of rpc_call( ) process. The rpc_call( ) process is adapted by the inclusion of a new security containment function call, for example having the form:

```
"network_services_mac_access_check (
                        network_service_name,
                        rpc_info_pointer,
                        compartment)."
```

According to the present ypserv example, the network_services_mac_access_check( ) arguments are:

```
            network_service_name = "RPC"
            rpc_info_pointer = 100004
            compartment = FS
```

For other services, such as XTERM, an equivalent to the rpc_call( ) process would be adapted to include a network_services_mac_access check( ) function call (or 'hook'), although, of course, the parameters would match those required for the XTERM service rather than those for the RPC service. The network_services_mac_access_check( ) function itself is part of the Security Containment Controller.

Figure 5:
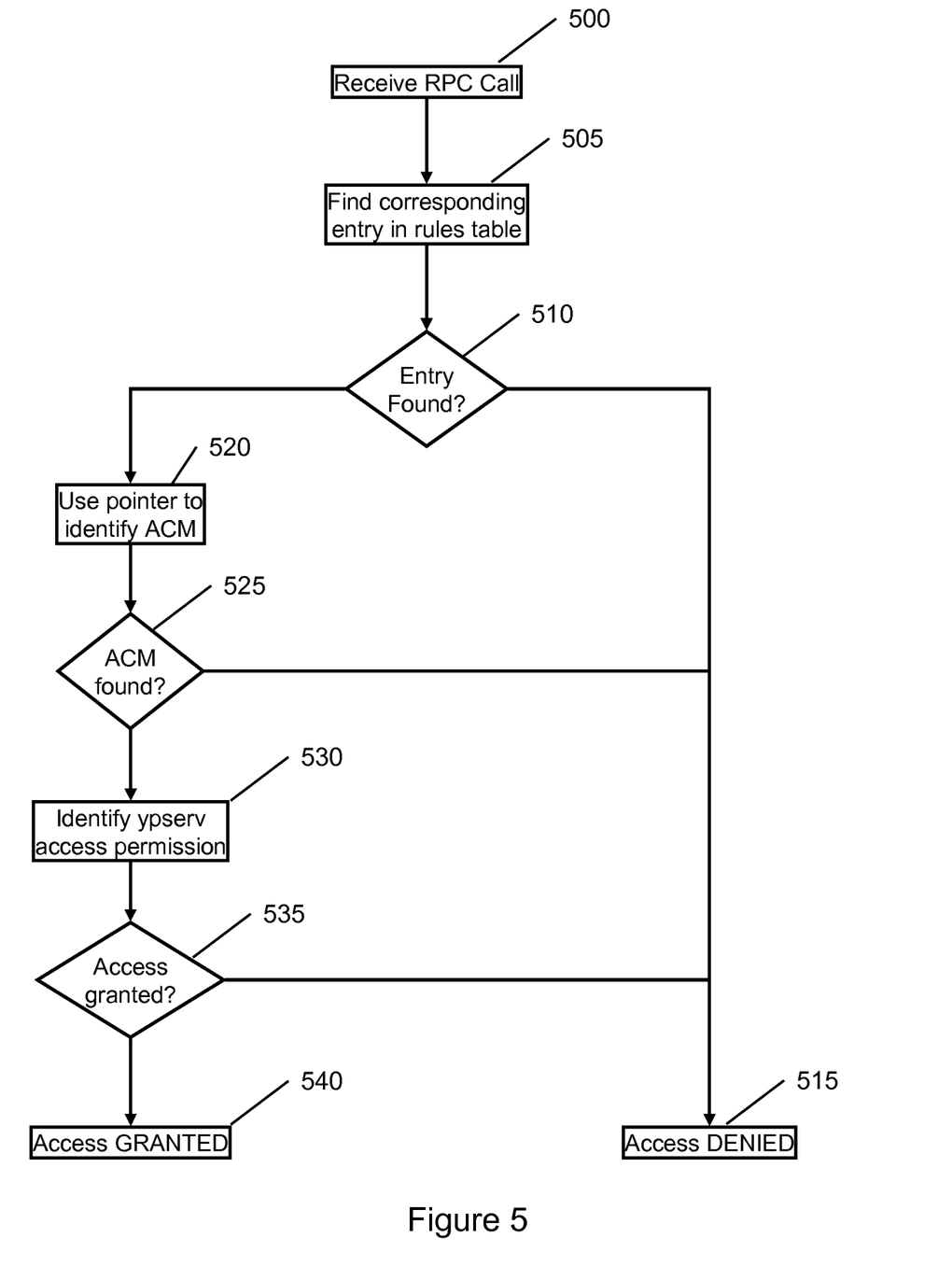
FIG. 5 is a flow diagram showing steps involved in controlling access to a network service according to an embodiment of the present invention.

In the next step 505 in FIG. 5, the network_services_mac_access_check( ) function searches the Security Containment Rules function 412 to identify an entry which corresponds both to the FS compartment and to the Module Name "RPC". In step 510, if an entry does not exist, then the default response is that the access control request is denied in step 515, and the response is passed back, via the network_services_mac_access_check( ) function to the rpc_call( ) process, and the calling entity is informed in the traditional way that access is denied. If, however, the entry exists (which it does according to FIG. 4), then, in step 520, the respective opaque pointer 426 is used to identify the corresponding Access Check Module 428. If the module does not exist, in step 525, then, again, the default response is that the access request is denied in step 515. If the module exists (which is does, named "RPC Access Check Module" in FIG. 4) then, in step 530, the module uses the rpc_info_pointer value to identify a respective access permission for the ypserv procedure. Although not illustrated in order to reduce complexity in the diagram in FIG. 4, the RPC Access Check Module 434 contains a table defining the access control rules for one or more RPC network services and logic for searching for an appropriate access control rule for the specified service (identified by the RPC Prog Number). In step 535, if the access permission is present and is GRANT, then, in step 540, access to the service is granted, and permission is passed back via the network_services_mac_access_check( ) function to the rpc_call( ) process, which undertakes to invoke the RPC service in interactions with the target RPC server in the normal way. If the access permission is "DENY" (or there is no access permission set for the specified RPC network service), then the access permission is denied, in step 515, the response is passed back, via the network_services_mac_access_check( ) function to the rpc_call( ) process, and the calling entity is informed in the traditional way that access is denied.

Network service access permissions are set according to the present embodiment by adding appropriate entries to the Security Containment Rules function 412, which is used by the Security Containment Controller 410, as illustrated in the diagram in FIG. 4.

An example of setting network service access permissions, according to embodiments of the present invention, in the HP-UX Security Containment secure operating system, will now be described for the exemplary compartment called "FS". The access permissions, like other compartment rules, are entered into a text file (in the HP-UX product) called database.rules. The text file takes the following form:

```
compartment FS {
      DPR   G   RPC 100003    {grant access to 'NFS'}
      DPR   G   RPC 100004    {grant access to 'ypserv'}
      DPR   G   RPC 100005    {grant access to 'mountd'}
      DPR   G   RPC 100006    {grant access to 'rpcbind'}
      DPR   G   XTERM putty   {grant access to 1st xterm service,
      'putty'}
      DPR   D   XTERM refx    {deny access to 2nd xterm service,
      'refx'}
}
```

The above defines a compartment called 'FS' and defines MAC rules granting access to the RPC services 'NFS', 'ypserv' and 'mountd', in addition to granting access to a first XTERM service 'putty' and denying access to a second XTERM service 'refx'.

A similar text structure would be provided for every other compartment for which MAC rules are required.

According to the HP-UX Security Containment operating system, which, as has been described, can be adapted to operate according to embodiments of the present invention, compartment and respective MAC rules are typically loaded into the Security Containment Rules function 412 using a program called setrules, which is found in the system directory /usr/sbin. The setrules program is arranged to parse database.rules and set each rule for a compartment in turn. The setrules program is arranged to read database.rules from a system directory called /etc/cmpt, which is where the systems administrator must store database.rules.

The system administrator executes setrules using the following command line:

/usr/sbin/setrules

The secure operating system illustrated in FIG. 4 includes a functional block 450 representing the setrules program. As already described, the program resides in a specified directory /usr/sbin/setrules, but is shown as part of the Security Containment Controller 410, as it provides an interface, which enables a systems administrator to set up compartments on the basis of a text file definition, rather than having to access and generate or modify kernel code or associated definitions. When a systems administrator wishes to set up a compartment by defining its MAC policy as described above, they generate a text file, for example called database.rules, and store it in the /etc/cmpt directory. They then issue a command line such as:

/usr/sbin/setrules to initiate the generation of the compartment. The System Call Interface 406 receives the command input, recognises it and forwards it to a Set Access Handler 452, which in turn accesses the setrules function and loads the compartment definitions.

An exemplary process for building a MAC rule for accessing a network service which uses a dynamically assigned port number will now be described with reference to the flow diagram in FIG. 6, which is based on the compartment definition described above for the FS compartment.

Figure 6:
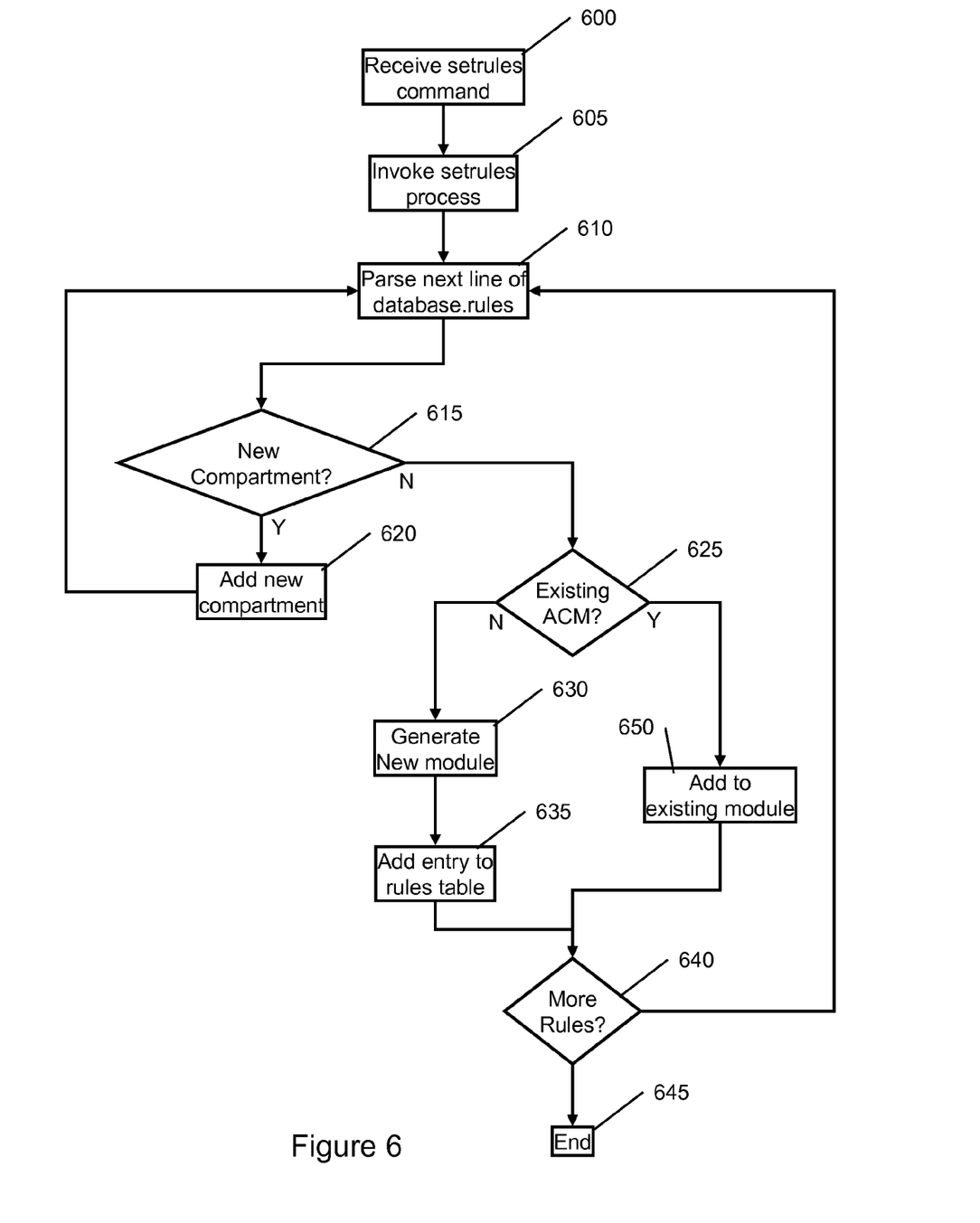
FIG. 6 is a flow diagram showing the steps involved in defining new compartment Mandatory Access Control rules for network services which use dynamic port assignments.

In a first step 600 in FIG. 6, the System Call Interface 406 receives a setrules command and passes it to the Set Access Handler 452. The Set Access Handler 452 invokes the setrules program in step 605. The setrules program accesses the database.rules file and parses the first lines of definition text in step 610. In this example, the first line of the definition file defines a new compartment called "FS". In step 615, if the line is a compartment definition line then, in step 620, a new compartment entry is added to a compartment list (not shown) for the secure operating system, any subsequent MAC rules are associated with that compartment and the process returns to step 610 wherein the next line of definition text is parsed. If, in step 615, the line is a DPR rule for a compartment, then the process continues with step 625. In this example, only the process for the DPR rule is included, and it will be appreciated that other known and equivalent procedures would be provided for such other rule kinds. In step 625, the process identifies (using the <MODULE> field) if the rule is an addition to an existing Access Check Module or if the rule requires the generation of a new Access Check Module. If the rule relates to a new Access Check Module, in step 630 the process finds an appropriate RPC service template for a respective Access Check Module (where each known service for which a rule may be set has a pre-defined template, providing the framework for a specific Access Check Module) and generates a new Access Check Module (using the <MODULE> field as the identifier, the <STRING> value 100003 to fill the RPC Prog Number field and the G/D value is the permission). In step 635, the process adds an entry to the rules table 418; the entry comprising a first field 420 containing the compartment ID, a second field 422 containing the module name and an opaque pointer (in the third field 424), which points the table entry to the Access Check Module code. Next, in step 640, the process determines if there are any more rules in the definition. If there are more rules to define, then the process returns to step 610 to parse the next line of the definition. If there are no more rules to define then the process ends in step 645.

If, in step 625, it is determined that the new rule adds to an existing Access Check Module, then, in step 650, the process adds an entry to the existing Access Check Module using the <STRING> value 100003 to fill the RPC Prog Number field and the G/D value is the permission. The process then continues with step 640.

The process in FIG. 6 repeats for each rule in the definition until no new rules are found and the process ends. The result is that the rules table is populated with references to all compartment rules that are needed for controlling access to network services by the secure operating system.

The above embodiments are to be understood as illustrative examples of the invention. Further embodiments of the invention are envisaged. While it has been indicated that certain embodiments of the invention may be implemented by adapting an HP-UX Security Containment secure operating system, other embodiments may be implemented by adapting other known secure operating systems such as SELinux™ or Trusted Solaris™, or, indeed, any other secure operating system that can be adapted to define compartment rules for accessing network services that use dynamically assigned ports.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, devices or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An access control system, comprising:
a plurality of access check modules;
a security containment controller to:
    define compartments that each includes rules to control access of requesting entities to network services on a server having dynamically-assigned communication ports, and
    access a compartment rules table of entries, wherein each of the entries includes a compartment identifier, a network service identifier, and a pointer to an access check module of the plurality of access check modules;
the plurality of access check modules storing permissions corresponding to the rules, the network service identifier, and a network service program number of an entry in the compartment rules table in a storage device; and
a network services handler to:
    receive a network service call via a network from a requesting entity to access a network service, wherein the network service call includes the compartment identifier and the network service identifier of an entry in the compartment rules table, map the network service call to a matching entry in the compartment rules table containing the compartment identifier and the network service identifier of the network service call,
identify the access check module to which the pointer in the matching entry points, and
process the network service call in response to the stored permission in the identified access check module granting permission to access the network service.

2. The system of claim 1, wherein the pointer is an opaque pointer.

3. The system of claim 1, wherein the network services handler comprises remote procedure call (RPC) functionality for processing the network service call.

4. The system of claim 1, wherein the network services handler comprises XTERM call functionality for processing the network service call.

5. The system of claim 1, wherein the rules comprise Mandatory Access Control rules to control the access of requesting entities to network services on the server having the dynamically-assigned communication ports.

6. The system of claim 1, wherein the security containment controller, the plurality of access check modules, and the network services handler are included in a secure operating system.

7. The system of claim 1, comprising a local area network card controller to connect the network services controller to a network services on the server.

8. An access control method comprising:
defining compartments that each includes rules to control access of requesting entities to network services on a server having dynamically-assigned communication ports;
accessing a compartment rules table of entries, wherein each of the entries includes a compartment identifier, a network service identifier, and a pointer to an access check module of a plurality of access check modules;
storing, by the access check module in a storage device, permissions corresponding to the rules, the network service identifier, and a network service program number of an entry in the compartment rules table;
receiving a network service call via a network from a requesting entity to access a network service, wherein the network service call includes the compartment identifier and the network service identifier of an entry in the compartment rules table;
mapping the network service call to a matching entry in the compartment rules table containing the compartment identifier and the network service identifier of the network service call;
identifying the access check module to which the pointer in the matching entry points; and
processing the network service call in response to the stored permission in the identified access check module granting permission to access the network service.

9. A non-transitory computer readable medium including machine readable instructions that are executed by a processor to cause the processor to:
define compartments that each includes rules to control access of requesting entities to network services on a server having dynamically-assigned communication ports;
access a compartment rules table of entries, wherein each of the entries includes a compartment identifier, a network service identifier, and a pointer to an access check module of a plurality of access check modules;
store, by the access check module in a storage device, permissions corresponding to the rules, the network service identifier, and a network service program number of an entry in the compartment rules table;
receive a network service call via a network from a requesting entity to access a network service, wherein the network service call includes the compartment identifier and the network service identifier of an entry in the compartment rules table;
map the network service call to a matching entry in the compartment rules table containing the compartment identifier and the network service identifier of the network service call;
identify the access check module to which the pointer in the matching entry points; and
process the network service call in response to the stored permission in the identified access check module granting permission to access the network service.

* * * * *